(12) United States Patent
Kwon et al.

(10) Patent No.: US 9,938,882 B2
(45) Date of Patent: Apr. 10, 2018

(54) COOLANT CIRCULATION SYSTEM FOR TURBOCHARGER

(71) Applicants: Hyundai Motor Company, Seoul (KR); Kia Motor Corporation, Seoul (KR)

(72) Inventors: Chun Kyu Kwon, Hwaseong-si (KR); Jun Ho Song, Hwaseong-si (KR); Nam Shin Kim, Suwon-si (KR); Chi Weon Jeong, Hwaseong-si (KR); Kyoung Duk Rho, Suwon-si (KR); Chang Won Lee, Suwon-si (KR); Ki Lyong Jang, Suwon-si (KR); Seung Ho Mok, Yongin-si (KR); Sung Woo Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 82 days.

(21) Appl. No.: 14/942,291

(22) Filed: Nov. 16, 2015

(65) Prior Publication Data

US 2017/0016379 A1    Jan. 19, 2017

(30) Foreign Application Priority Data

Jul. 14, 2015    (KR) ........................ 10-2015-0100071

(51) Int. Cl.
| | |
|---|---|
| *F01P 3/12* | (2006.01) |
| *F01P 5/10* | (2006.01) |
| *F01P 5/02* | (2006.01) |
| *F01P 1/06* | (2006.01) |
| *F01P 7/02* | (2006.01) |
| *B60K 11/02* | (2006.01) |

(52) U.S. Cl.
CPC ................ *F01P 3/12* (2013.01); *F01P 1/06* (2013.01); *F01P 5/02* (2013.01); *F01P 5/10* (2013.01); *F01P 7/02* (2013.01); *B60K 11/02* (2013.01); *B60Y 2400/435* (2013.01)

(58) Field of Classification Search
CPC ....... F01P 7/02; F01P 1/06; F01P 3/12; B60K 11/02
See application file for complete search history.

(56) References Cited

U.S. PATENT DOCUMENTS

| | | | | |
|---|---|---|---|---|
| 4,461,342 A | * | 7/1984 | Avrea ....................... | F01P 11/02 123/41.54 |
| 4,930,460 A | * | 6/1990 | Aihara ................... | B60K 11/00 123/41.31 |
| 5,333,679 A | * | 8/1994 | Suzuki ..................... | B60H 1/22 122/26 |

FOREIGN PATENT DOCUMENTS

| | | |
|---|---|---|
| JP | H11-14283 | 1/1999 |
| JP | 2002349261 A * | 12/2002 |

(Continued)

*Primary Examiner* — Kevin A Lathers
(74) *Attorney, Agent, or Firm* — Brinks Gilson & Lione

(57) ABSTRACT

A coolant circulation system for turbochargers is provided. The coolant circulation system includes a turbocharger provided with a coolant outlet line and a coolant inlet line. The coolant is discharged from the turbocharger through the coolant outlet line. The coolant outlet line is connected to a first flow path connecting an inlet port of a radiator to an outlet port of a heater core. The coolant is supplied into the turbocharger through the coolant inlet line. The coolant inlet line is connected to a second flow path connecting a first end of a water pump to an inlet port of the heater core.

3 Claims, 2 Drawing Sheets

(56) References Cited

FOREIGN PATENT DOCUMENTS

| JP | 2010-048187 A | 3/2010 |
|----|---------------|--------|
| JP | 2013-015075 A | 1/2013 |
| KR | 10-2010-0004478 A | 1/2010 |
| KR | 10-2013-0090188 A | 8/2013 |
| KR | 10-2013-0130488 A | 12/2013 |
| KR | 10-1405667 | 6/2014 |
| KR | 10-2015-0058842 | 5/2015 |

* cited by examiner

FIG. 1 "PRIOR ART"

COOLANT CIRCULATION SYSTEM FOR TURBOCHARGER

CROSS REFERENCE TO RELATED APPLICATION

The present application claims the benefit of the Korean Patent Application No. 10-2015-0100071, filed Jul. 14, 2015, which is incorporated herein by reference in its entirety.

FIELD

The present disclosure relates to a coolant circulation system for turbochargers which can reduce noise caused by coolant discharged from a turbocharger.

BACKGROUND

The statements in this section merely provide background information related to the present disclosure and may not constitute prior art.

When an engine of a vehicle stops after the vehicle has been driven, coolant in a turbocharger is vaporized and discharged therefrom, and thus the turbocharger is maintained in a high-temperature state.

Figure 1:
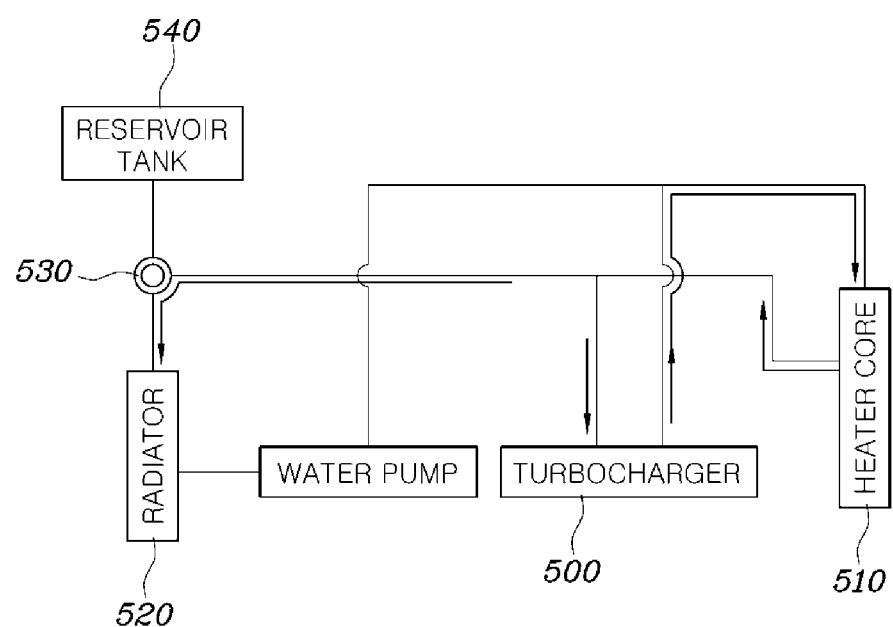

FIG. 1 is a block diagram showing a coolant circulation system for a turbocharger according to a conventional technique. When the ignition of a vehicle is turned off while a turbocharger 500 is in a high-temperature state, coolant is continuously drawn into the turbocharger 500 that is in the high-temperature state, so that a large amount of vapor generated by a coolant boiling phenomenon is transmitted to a heater core 510. Thereby, boundary noise is generated by contact between liquefied coolant and gaseous coolant in the heater core 510.

Furthermore, when a large amount of vapor is supplied to a radiator cap 530, an overflow phenomenon is caused, whereby noise is generated from a reservoir tank 540.

In an effort to overcome the problem of noise, a conventional technique was proposed, in which an additional electric water pump is provided so that even after the ignition of the vehicle is turned off, coolant is continuously supplied to a turbocharger for a predetermined time so as to reduce the temperature of a bearing housing and thus prevent a coolant boiling phenomenon.

However, this conventional technique is problematic in that the production cost and the weight increase because the additional electric water pump is required.

SUMMARY

The present disclosure proposes a coolant circulation system for a turbocharger which is configured such that coolant of the turbocharger is structurally prevented from being drawn into a heater core, thus preventing noise from being generated due to a coolant boiling phenomenon in the turbocharger.

According to one aspect, there is provided a coolant circulation system for turbochargers, including a turbocharger having: a coolant outlet line configured such that coolant is discharged out of the turbocharger therethrough, the coolant outlet line being connected to a first flow path connecting an inlet port of a radiator to an outlet port of a heater core; and a coolant inlet line configured such that coolant is supplied into the turbocharger therethrough, the coolant inlet line being connected to a second flow path connecting a first end of a water pump to an inlet port of the heater core.

The coolant circulation system may further include a radiator cap provided adjacent to an outlet port of the radiator and configured to discharge coolant to the reservoir tank depending on a pressure in the radiator.

The water head resistance at the outlet port of the heater core is greater than the water head resistance at the inlet port of the radiator.

The coolant circulation system may further include a cooling fan provided on a side of the radiator and configured to cool the radiator when the ignition of the vehicle is turned off.

The radiator may receive coolant through the inlet port provided on an upper end thereof, cool the coolant, and then discharge the coolant through the outlet port provided on a lower end thereof.

Coolant that has passed through the radiator cap may be supplied to a second end of the water pump, and the first end of the water pump may be connected to the inlet port of the heater core.

According to the coolant circulation system having the above-mentioned construction, when the ignition of a vehicle is turned off, coolant discharged from the turbocharger can be structurally prevented from being drawn into the heater core. Therefore, noise and vibration which are generated from the heater core can be markedly reduced.

Furthermore, the coolant circulation system is configured such that coolant discharged from the turbocharger is supplied to the radiator cap after being cooled by the radiator, thus mitigating the problem of noise and vibration attributable to an overflow phenomenon of the radiator cap.

Further areas of applicability will become apparent from the description provided herein. It should be understood that the description and specific examples are intended for purposes of illustration only and are not intended to limit the scope of the present disclosure.

DRAWINGS

Figure 2:
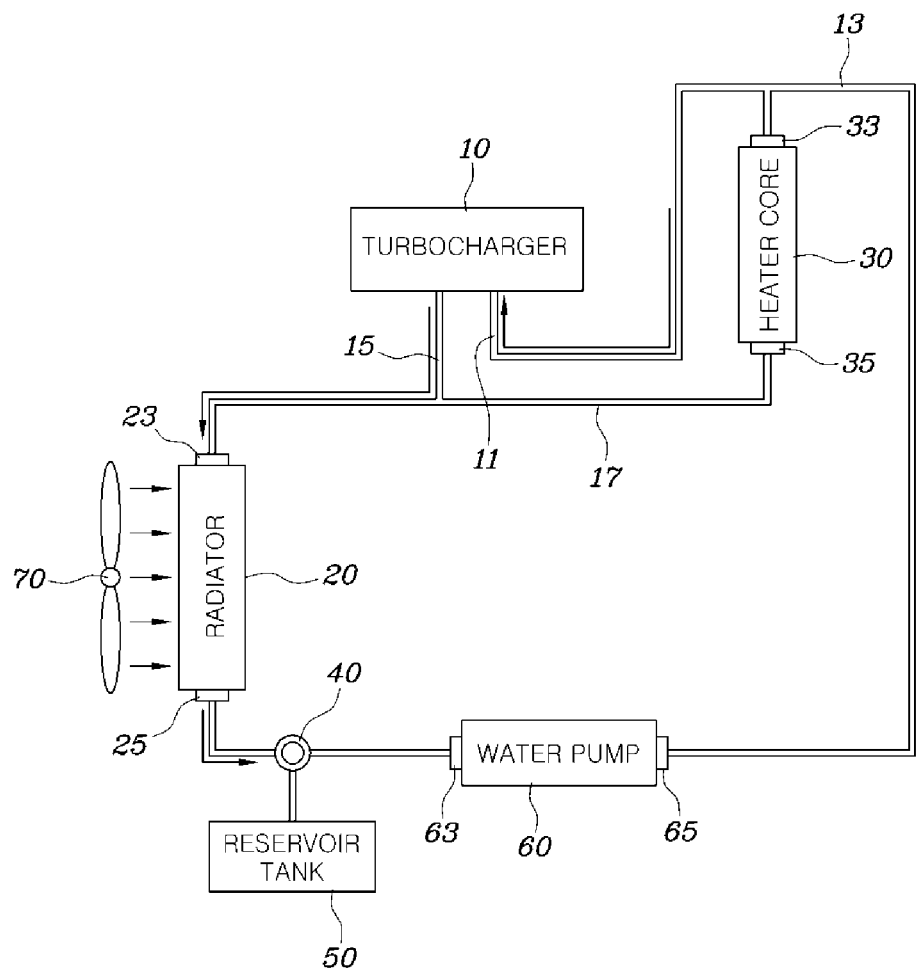

In order that the disclosure may be well understood, there will now be described various forms thereof, given by way of example, reference being made to the accompanying drawings, in which:

FIG. 1 is a block diagram showing a coolant circulation system for a turbocharger according to a conventional technique; and FIG. 2 is a block diagram illustrating a coolant circulation system for a turbocharger according to an exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 2 illustrates a coolant circulation system for a turbocharger according to an exemplary embodiment of the present disclosure. Referring to FIG. 2, the coolant circulation system includes a turbocharger 10 which is provided with a coolant outlet line 15 and a coolant inlet line 11. The coolant outlet line 15, through which coolant is discharged out of the turbocharger 10, is connected to a first flow path 17 that connects an inlet port 23 of a radiator to an outlet port 35 of a heater core. The coolant inlet line 11, through which coolant is supplied into the turbocharger 10, is connected to a second flow path 13 that connects a first end 65 of a water pump to an inlet port 33 of the heater core.

In the conventional technique, the coolant outlet line of the turbocharger is provided between the inlet port of the heater core and the oil cooler. Thus, when the ignition of the vehicle is turned off, a large amount of vapor that is generated by coolant boiling over in the turbocharger heated to a high temperature is drawn into the heater core. Vapor drawn into the heater core meets liquefied coolant and thus causes a coolant boiling phenomenon and vibration, thus generating noise.

According to one form of the present disclosure, the coolant outlet line 15 through which coolant is discharged out of the turbocharger 10 is connected to the first flow path 17 that connects the inlet port 23 of the radiator to the outlet port 35 of the heater core 30. Therefore, when the ignition of the vehicle is turned off, a large amount of vapor generated from the turbocharger 10 heated at a high temperature is prevented from being drawn into the heater core 30 and is directly guided into the radiator 20. As a result, the coolant circulation system according to the present embodiment can reduce vibration and noise generated when a large amount of vapor is drawn into the heater core 30.

The coolant circulation system according to the present embodiment may further include a radiator cap 40 which is provided adjacent to the outlet port 25 of the radiator 20 and configured to discharge coolant to a reservoir tank 50 in response to the pressure in the radiator 20.

In the case of the conventional technique, a large amount of vapor discharged from the turbocharger is supplied to the radiator cap via the heater core. Then, the radiator cap discharges the supplied vapor to the reservoir tank so as to maintain the pressure in the radiator at a constant level, the discharge causes a noise.

According to one form of the present disclosure, the radiator cap 40 is provided on the outlet port 25 of the radiator 20 so that coolant discharged from the turbocharger 10 is cooled by the radiator 20 before being supplied to the radiator cap 40.

Therefore, the coolant vapor supplied to the radiator cap 40 is reduced, whereby noise and vibration which are generated when the coolant vapor is discharged to the reservoir tank 50 can be reduced.

Furthermore, the coolant circulation system according to the present embodiment may further include a cooling fan 70 which is provided on a side of the radiator 20 so as to cool the radiator 20 when the ignition of the vehicle is turned off.

That is, generally, after the ignition of the vehicle is turned off, a large amount of vapor generated by the coolant boiling phenomenon is supplied from the turbocharger 10 to the radiator 20. Given this, the present embodiment is configured such that the vapor is cooled before being supplied to the radiator cap 40, thus preventing noise and vibration from being caused by an overflow phenomenon.

For this, even when the ignition of the vehicle is turned off, the cooling fan 70 may be forcibly operated so as to maintain the cooling performance of the radiator 20.

Here, the radiator 20 receives coolant through the inlet port 23 provided on an upper end thereof, cools the coolant, and then discharges it to the outside through the outlet port 25 provided on a lower end thereof.

Meanwhile, the present embodiment is characterized in that the water head resistance at the outlet port 35 of the heater core is greater than the water head resistance at the inlet port 23 of the radiator.

That is, when the ignition of the vehicle is turned off, coolant is drawn from the engine into the turbocharger 10 heated to a high temperature. Then, a large amount of vapor is discharged from the turbocharger 10 to the first flow path 17 through the coolant outlet line 15. Here, because the water head resistance at the outlet port 35 of the heater core is higher than the water head resistance at the inlet port 23 of the radiator, vapor generated from coolant is supplied to only the radiator 20.

The water head resistance can be set to be variable in response to the heights of the outlet port 35 of the heater core and the inlet port 23 of the radiator, the cross-sectional area of the first flow path 17, or a difference between the length of the flow path adjacent to the outlet port 35 of the heater core and the flow path adjacent to the inlet port 23 of the radiator.

Coolant that has passed through the radiator cap 40 is supplied to a second end 63 of the water pump 60. The first end 65 of the water pump 60 is connected to the inlet port 33 of the heater core.

As described above, in accordance with the coolant circulation system having the above-mentioned construction, when the ignition of the vehicle is turned off, coolant discharged from the turbocharger can be structurally prevented from being drawn into the heater core. Therefore, noise and vibration which are generated from the heater core can be markedly reduced.

Furthermore, the coolant circulation system is configured such that coolant discharged from the turbocharger is supplied to the radiator cap after being cooled by the radiator, thus mitigating the problem of noise and vibration attributable to an overflow phenomenon of the radiator cap.

Although an exemplary embodiment of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A coolant circulation system for turbochargers comprising:
 a turbocharger;
 a coolant outlet line through which a coolant is discharged out of the turbocharger, the coolant outlet line being connected to a first flow path directly connecting an inlet port of a radiator to an outlet port of a heater core;
 a coolant inlet line through which the coolant is supplied into the turbocharger, the coolant inlet line being connected to a second flow path directly connecting a first end of a water pump to an inlet port of the heater core; and
 a radiator cap provided adjacent to an outlet port of the radiator and configured to discharge the coolant to a reservoir tank depending on a pressure in the radiator,
 wherein the radiator receives the coolant through the inlet port of the radiator provided on an upper end of the radiator, cools the coolant, and then discharges the coolant through an outlet port of the radiator provided on a lower end of the radiator, and
 wherein the coolant passing through the radiator cap is supplied to a second end of the water pump, and the first end of the water pump is connected to the inlet port of the heater core.

2. The coolant circulation system according to claim 1, wherein a water head resistance at the outlet port of the heater core is greater than a water head resistance at the inlet port of the radiator.

3. The coolant circulation system according to claim 1, further comprising:
- a cooling fan provided on a side of the radiator and configured to cool the radiator when an ignition of a vehicle is turned off.

* * * * *